April 9, 1946.  H. F. MacMILLIN ET AL  2,398,318
METHOD AND APPARATUS FOR PLASTIC INJECTION
Filed June 12, 1943
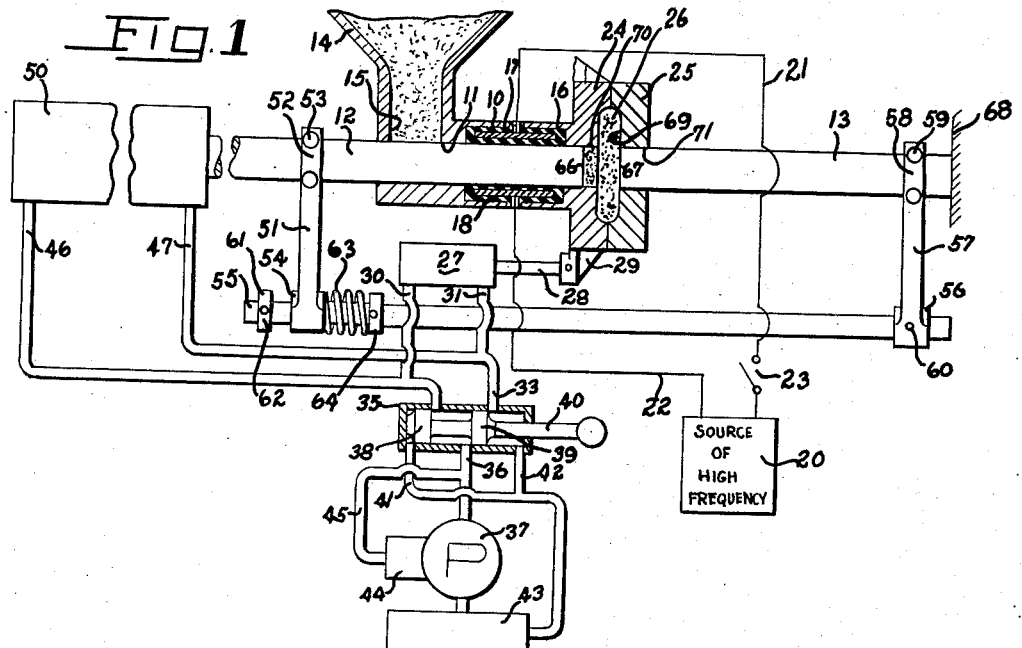
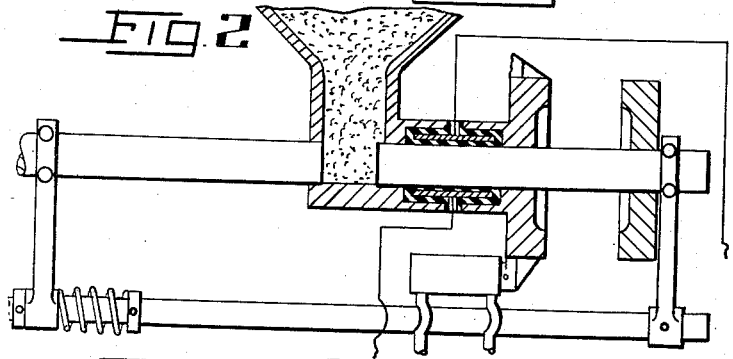
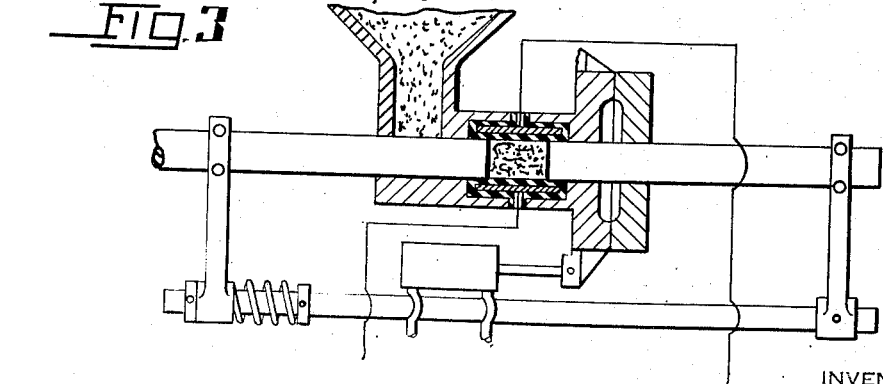
INVENTOR
HOWARD F. MacMILLIN
WALTER ERNST
BY GEORGE A. WALDIE
Toulmin & Toulmin
ATTORNEYS Patented Apr. 9, 1946

2,398,318

UNITED STATES PATENT OFFICE 2,398,318

METHOD AND APPARATUS FOR PLASTIC INJECTION

Howard F. MacMillin, Walter Ernst, and George A. Waldie, Mount Gilead, Ohio, assignors to The Hydraulic Development Corp., Inc., Wilmington, Del., a corporation of Delaware Application June 12, 1943, Serial No. 490,552

5 Claims. (Cl. 18—30)

This invention relates to a method and apparatus for heating and molding plastic materials.

An object of the invention is to provide a method and apparatus for heating and molding plastic material wherein a predetermined charge of plastic material is placed between carrying elements that moves the charge into a heating zone and subsequently moves the charge into a mold and applies pressure upon the plastic material in the mold wherein the material is cured or set.

Another object of the invention is to provide a method and apparatus for heating and molding plastic material wherein the plastic material is heated within a field of high frequency current to rapidly and uniformly heat the same throughout the entire cross section thereof when the heating and molding process is carried out in accordance with the foregoing object.

Another object of the invention is to provide a process for heating and molding plastic material wherein a predetermined charge of plastic material is placed between carrier elements that move the charge of material into a heating zone to raise the temperature of the material and place the same in a condition suitable for molding, and wherein the carrier elements move the complete charge of plastic material into a mold through an opening that offers substantially no resistance to the movement of plastic material through the same and thereafter apply pressure upon the plastic material to cause the same to conform to the shape of the mold cavity.

Another object of the invention is to provide a method and apparatus for heating and molding thermosetting resins wherein a predetermined charge of resin is raised to a temperature at which polymerization proceeds rapidly and is subsequently transferred into a mold cavity in accordance with the foregoing objects.

Another object of the invention is to provide an apparatus wherein plastic material is heated and molded that is constructed and arranged in a manner that a predetermined charge of plastic material is positioned between a pair of reciprocating plungers so that the charge of material can be transferred into a heating zone wherein the plastic material is heated to a temperature satisfactory for molding and the plungers then carry the plastic material between the same into a mold so that at least one of them can apply pressure upon the plastic material in the mold and force the same to conform with the shape of the mold cavity.

Further objects and advantages will become apparent from the drawing and the following description.

In the drawing:

Figure 1 is a schematic view of an apparatus, partially in cross section for performing the objects of this invention, and shows the plastic material in a mold with pressure being applied thereon.

Figure 2 is a schematic view of a portion of the apparatus shown in Figure 1 to illustrate the position of the elements when a fresh charge of plastic material is being fed between the carrying elements for the same.

Figure 3 is a schematic view of a portion of the mechanism shown in Figure 1 showing the position of the elements of the apparatus when plastic material is being heated within a high frequency heating zone.

In this invention the apparatus for heating and molding plastic material consists of a heating chamber 10 that has an internal bore 11 within which the plungers 12 and 13 are adapted to reciprocate. A feed hopper 14 is associated with the heating chamber 10 and has a feed opening 15 that opens into the internal bore 11 of the heating chamber 10.

The heating chamber 10 is provided with a body of electrical insulating material 16 in which there is imbedded a pair of electrodes 17 and 18 positioned on opposite sides of the cylinder bore 11.

The electrodes 17 and 18 are connected to a source of high frequency 20 by means of the conductors 21 and 22, respectively, a control switch 23 being provided in the conductor 21 to control the application of high frequency current to the electrodes 17 and 18.

The source of high frequency 20 may be any suitable source of radio frequency power that is capable of producing high frequencies on the order of 1,500,000 to 10,000,000 cycles, depending upon the material to be heated and the rapidity of which the material will be heated. Radio frequency power, or high frequency power has been found to be satisfactory for heating materials that normally are resistant to heat transfer, or heat conduction therethrough, such as wood, plastics and others. If sufficient power is generated, and the frequency of power is sufficiently high, the high frequency current will pass through a body of heat resistant material and uniformly heat the entire mass of the material, particularly when the electrodes that are connected to opposite sides of the source of high frequency are spaced uniformly from one another so that the intensity of the high frequency field between the electrodes is substantially constant, or uniform, throughout the field.

In the case of many of the poor conductors of electric current such as wood, plastics and others, the resistance to the passage of low frequency current is very high in contradistinction to the low resistance to the passage of electric current by means of the various metals. The voltage that would be required to cause a 60 cycle current, for example, to pass through the poor conductors would be so high as to be out of practical consideration. However, if the frequency of the current is increased, the resistance of these materials drop rapidly so that at the frequencies in the range of what we normally call radio frequencies the resistance to the passage of current becomes low enough that it is practical to force current through these poor conductors of electric current in order to heat the same. While this is one theory held by some of the writers on the subject, there is also a second theory that the heating of the poor conductors of electric current by means of high frequency current is accomplished by internal molecular friction produced as a result of the rapidity of the reversing cycle of the current passing through the material.

Regardless, however, of the theory that is accepted, it is now known that the poor conductors of electric current, which are also poor conductors of heat, can be heated by the application of high frequency current to the materials by placing them between the electrodes having the high frequency current applied thereto so that the material will be within the field of high frequency current.

When the applicant thus speaks of a source of high frequency, he is referring to such a source of high frequency, and the plastic material that is heated within the heating chamber 10 is heated by such radio frequency current.

A mold or die member 24 is associated with the heating chamber 10 and is adapted to be moved therewith when the mold 24 is separated from the stationary mold or die 25 to permit ejection of a work piece from the mold cavity 26 provided by co-operation of the die elements 24 and 25. One or more double-acting hydraulic motors 27 are provided for opening and closing the die members 24 and 25 and particularly to move the die member 24 relative to the die member 25. The hydraulic motor, or motors, is provided with a plunger 28 that engages a bracket 29 extending from the mold or die 24. The end of the plunger 28 within the cylinder of the hydraulic motor 27 is provided with a piston in a conventional manner so that fluid entering the hydraulic motor 27 through the conduits 30 and 31 will reciprocate the plunger 28.

The conduits 30 and 31 are connected to supply conduits 32 and 33 that are connected to a 4-way flow control valve 35 whereby fluid under pressure can be directed into either of the conduits 30 and 31.

The flow control valve 35 is more or less of conventional form and is provided with an inlet conduit 36 that directs pressure fluid from the pump 37 into the valve 35 to be distributed to the conduits 32 and 33 according to the position of the piston heads 38 and 39 that are connected to an actuating rod 40 extending beyond the body of the valve 35. Return flow conduits 41 and 42 are connected to the control valve 35 for returning fluid to the reservoir 43. The pump 37 may be of the variable delivery constant pressure type and be controlled by means of the control element 44 that is responsive to the pressure in the discharge conduit 26 from the pump 37, a conduit 45 connecting the control element 44 to the conduit 36 for this purpose.

The plunger 12, previously mentioned, is operated by a double-acting hydraulic motor 50, the plunger 12 being an extension of the plunger of the hydraulic motor 50. Fluid supply conduits 46 and 47 are connected to opposite ends of the hydraulic motor 50 for conducting fluid to the motor in accordance with the setting of the control valve 35, these conduits 46 and 47 being extensions of the supply conduits 32 and 33 that are connected to the control valve 35.

An arm 51 is secured to the plunger 12 in any suitable manner to prevent axial movement of the arm on the plunger 12 but which may permit adjustment of the arm upon the plunger 12, if desired, such means being a clamp 52 and the bolts 53. The free end of the arm 51 has an enlarged head 54 that is provided with an internal bore to slidably receive a rod 55. The opposite end of the rod 55 is positioned within an enlarged head 56 provided on an arm 57 that is secured to the plunger 13 by means of the clamp 58 and the bolts 59. The rod 55 is prevented from axial movement within the enlarged head 56 by means of the set screw 60, which may be loosened to permit adjustment of the arm 57 relative to the rod 55.

A collar 61 is secured to the rod 55 by means of a set screw 62 against which the arm 51 is urged by means of a spring 63 that has one end engaging the head 54 and the opposite end engaging a collar 64 that is retained on the rod 55 by means of the set screw 65.

It will thus be seen that the ends 66 and 67 of the plungers 12 and 13, respectively, can be positioned a predetermined distance from each other by adjusting the collar 61 upon the rod 55 so that when the arm 51 engages the collar 61, as shown in Figure 2, the ends 66 and 67 of the plungers 12 and 13 will be spaced a predetermined distance apart. Also, it may be seen from the foregoing description that the plunger 12 can move relative to the plunger 13 when the plunger 13 engages a stop 68 whereby the space between the ends of the plungers 12 and 13 will be reduced, as shown in Figure 1, to compress plastic material within a mold in a manner to be hereinafter described.

*Operation*

In order to describe the operation of the machine it will be assumed that the operation begins with the feeding of a fresh charge of plastic material and that the elements of the machine are therefore in the position shown in Figure 2, wherein the plungers 12 and 13 are spaced apart a predetermined distance according to the position of the collar 61 upon the rod 55, the spring 63 retaining the head 54 of the arm 51 in engagement with the collar 61. With the machine in this position it will be apparent that granular or powdered material from the hopper 14 will fall through the feed opening 15 into the space between the ends 66 and 67 of the plungers 12 and 13, respectively.

The fluid flow control valve 35 may now be shifted to the position shown in Figure 1 whereby fluid under pressure will be supplied through the valve 35 to the left-hand end of both hydraulic motors 27 and 50 to advance the plungers 28 and 12, respectively, connected thereto. When the plungers 28 and 12 advance, the mold 24 will be moved into engagement with the mold 25 and the plunger 13 will be carried in a rightward direction by means of the rod 55 and the arm 57 so that the charge of granular or powdered plastic material that is positioned between the ends of the plungers 12 and 13 will be advanced into the heating zone provided by the electrodes 17 and 18, as shown in Figure 3.

With the molds 24 and 25 now in the closed position the machine is ready to permit plastic material to enter the mold cavity 26. However, the movement of the plungers 12 and 13 may be arrested, in the position shown in Figure 3, a sufficient length of time by moving the valve 35 to neutral position to permit the plastic material to remain in the heating zone a sufficient length of time to raise the temperature thereof high enough to plasticize the plastic material sufficiently for molding purposes. Also, in place of arresting the movement of the plungers 12 and 13 they may be moved sufficiently slowly that the plastic material will be heated during its progress through the heating zone. However, it is preferable to arrest the movement of the plungers 12 and 13 because an accurate control over the temperature rise of the plastic material can thus be obtained in view of the fact that the intensity of the heating effect of the high frequency field will be known. It is, of course, understood that if desired automatic controls can be provided for operating the valve 35 to regulate the interval of time during which the plungers 12 and 13 are arrested.

The flow control valve 35 is again shifted into the position shown in Figure 1, thereby causing pressure fluid to be supplied to the left-hand end of the hydraulic motors 27 and 50. Since the mold member 24 is closed upon the mold member 25 there will be no actuation of the hydraulic motor 27. The pressure fluid supplied to the hydraulic motor 50 will cause both plungers 12 and 13 to move in a rightward direction, and since the full flow of the pump 37 is directed to the hydraulic motor 50, the plungers 12 and 13 will be moved at a rapid rate. The plunger 13 will move in a rightward direction until it strikes the stop 68 whereby the end 67 of the plunger 13 is flushed with the wall 69 of the cavity 26 so that the end wall of the plunger forms a part of the wall 69. The plunger 12 will continue to advance whereby the heated plastic material that is carried between the plungers 13 and 12 will be forced into the mold cavity 26 and pressure applied thereon by the plunger 12 so as to force the material into conformity with the shape of the cavity. The plunger 12 will retain pressure upon the plastic material in the cavity 26 until it has set or cured.

From the foregoing description it will be noted that the plungers 12 and 13 reciprocate within the mold in the internal bores 70 and 71, respectively, that are of the same diameter as the cylinder bore 11, the plunger 13 extending completely through both mold elements 24 and 25 when a fresh charge of plastic material is to be picked up by the plungers, as shown in Figure 2. By providing a mold opening 70 of the same size as the heating cylinder bore 11, the heated plastic material may be transferred from the heating zone into the mold cavity 26 at an extremely rapid rate, and since the end of the plunger 12 can enter the bore 70, all of the plastic material that is heated within the heating chamber, or zone, will be transferred into a part of the mold cavity, whereby all of the heated material will be removed from the mold when the formed article is ejected.

After the plastic material has set, or cured, within the mold cavity 26, the flow control valve 35 will be shifted in a rightward direction whereby the pump discharge conduit 36 will communicate with the conduit 33 and the conduit 32 will communicate with the conduit 41 so that pressure fluid can be delivered to the right-hand ends of the hydraulic motors 27 and 50. When the plunger 12 compressed the plastic material into the mold cavity 26, the arm 51 compressed the spring 63, as illustrated in Figure 1, it being recalled that the head 54 is also slidable upon the rod 55 to permit movement of the plunger 12 when the rod 55 was stationary.

With fluid being supplied to the right-hand end of the hydraulic motors 27 and 50, the plungers 28 and 12 move in a leftward direction so that the mold member 24 moves in a leftward direction away from the mold member 25, thereby opening the mold. When the plunger 12 has moved in a leftward direction a sufficient distance that the head 54 on the arm 51 engages the collar 61, the plunger 13 will then be moved by the rod 55 and the arm 57 to eject the formed article from the fold member 25. Thereafter, the plungers 12 and 13 will be in a predetermined spaced relationship, as illustrated in Figure 2, and will move in this relationship until the plunger 12 has the end 66 thereof adjacent the rear wall of the feed opening 15, as shown in Figure 2. At this position the hydraulic motor 50 will stop movement of the plungers 12 and 13, this function being accomplished either manually by shifting the valve 35 to neutral position, or it can be accomplished automatically by means of a suitable control mechanism that may be actuated by a limit switch at the end of travel of the plunger 12 to operate the valve 35.

The operation of the machine herein described is particularly advantageous when molding thermosetting resins because a predetermined charge of a thermosetting resin can be placed between the plungers 12 and 13 and subsequently advanced into the heating zone wherein the material will be raised to a temperature at which it is satisfactory for molding, and at which polymerization of the material proceeds rapidly. Since the entire charge of heated plastic material, in this case, thermosetting resin, may be transferred into the mold cavity 26 at an extremely rapid rate, the thermosetting resin will not have an opportunity to completely cure before the entire charge of resin has been transferred into the mold cavity and pressure applied thereon to force the same into conformity with the shape of the mold cavity. It will be apparent that when the entire charge of plastic material is placed within the mold cavity, and any excess that remains in the opening 70 will be cured along with the main portion of the formed article. All of the thermosetting resin that was heated will be removed from the heating chamber upon each cycle of operation of the machine. The method and apparatus herein described therefore provide an injection molding machine wherein thermosetting resin can be heated and molded in an intermediate but regular cycle of operation, and there will be no thermosetting resin within the heating or injection cylinder that will polymerize, or cure, and thus prevent subsequent operation of the machine.

While the process of heating and molding plastic material, and the apparatus illustrated to carry out the process, is a preferred form of the invention, yet it is to be understood that the invention is not limited to the particular form of the apparatus disclosed nor to the particular means for carrying out the process, but that all modifications of the invention that fall within the scope of the appended claims are intended to be included herein.

Having thus fully described my invention what I claim as new and desire to secure by Letters Patent is:

1. An apparatus for heating and molding plastic material that includes, an injection cylinder having a cylinder bore to receive plastic material, a body of electrical insulating material in said cylinder bore having a bore therethrough of the same size as the cylinder bore whereby to permit an injection plunger to traverse both bores, electrode plates embedded in said body of electrical insulating material on opposite sides of the bore through the same and adapted to be connected to a source of high frequency whereby to form a heating chamber, an opening in said injection cylinder through which material can be fed into the chamber, a mold associated with the chamber, a co-operating pair of plunger means reciprocable through said heating chamber including means interconnecting said plunger means to dispose them in spaced relationship whereby a charge of plastic material can be received therebetween, and an actuating mechanism for concomitantly moving said plunger means in their spaced relationship into operative association with said opening to place a charge of plastic material therebetween and through the heating chamber for depositing the charge of plastic material in the mold.

2. An apparatus for heating and molding plastic material that includes, an injection cylinder having a cylinder bore to receive plastic material, a body of electrical insulating material in said cylinder bore having a bore therethrough of the same size as the cylinder bore whereby to permit an injection plunger to traverse both bores, electrode plates embedded in said body of electrical insulating material on opposite sides of the bore through the same and adapted to be connected to a source of high frequency whereby to form a heating chamber, an opening in said injection cylinder through which material can be fed into the chamber, a mold associated with the chamber, a co-operating pair of plunger means reciprocable through said heating chamber including means interconnecting said plunger means to dispose them in spaced relationship whereby a charge of plastic material can be received therebetween, an actuating mechanism for concomitantly moving said plunger means in their spaced relationship into operative association with said opening to place a charge of plastic material therebetween and through the heating chamber for depositing the charge of plastic material in the mold, means for arresting the movement of one of said plunger means, said actuating mechanism continuing the advance of the other of said plunger means toward the arrested plunger means to place the plastic material therebetween under pressure in the mold.

3. The process of heating and molding a thermosetting resin that includes, placing a predetermined charge of resin within an injection cylinder and between spaced carrier members adapted to move the resin through a heating zone of high frequency energy established within the injection cylinder and into a mold, moving the carrier members together with the resin therebetween into said heating zone, arresting the movement of the carrier members to position the resin within the high frequency heating zone for a sufficient time to raise the temperature thereof to a point at which polymerization of the resin proceeds rapidly, and again moving the carrier members together with the heated charge of resin therebetween into a mold through an opening that offers substantially no resistance to the movement of the resin whereby to place the resin within the mold at an extremely rapid rate before polymerization is complete.

4. The process of heating and molding plastic material that includes, placing a charge of plastic material within an injection cylinder and between carrier members adapted to move the same through a heating zone of high frequency energy established within the injection cylinder and into a mold, moving the carrier members together with the plastic material therebetween into said heating zone whereby to heat the plastic material to a temperature suitable for molding, and moving the carrier members for transferring the heated plastic material therebetween into a mold and placing the plastic material in the mold under pressure by reducing the space between the carrier members.

5. The process of heating and molding plastic material that includes, placing a charge of plastic material within an injection cylinder and between carrier members that are arranged in spaced relationship for carrying the plastic material through a heating zone of high frequency energy established within the injection cylinder and into a mold, moving the carrier members to transfer the plastic material into said heating zone whereby to heat the plastic material to a temperature satisfactory for molding, transferring the plastic material between the carrier members into a mold by concomitant movement of the carrier members, and arresting the movement of one of the carrier members when the plastic material is within the mold to place the plastic material under pressure within the mold by continued movement of the other carrier member to reduce the space between the carrier members.

HOWARD F. MacMILLIN.
WALTER ERNST.
GEORGE A. WALDIE.